Nov. 18, 1924.
F. ZGOL
PICK
Filed Feb. 3, 1923
1,515,715
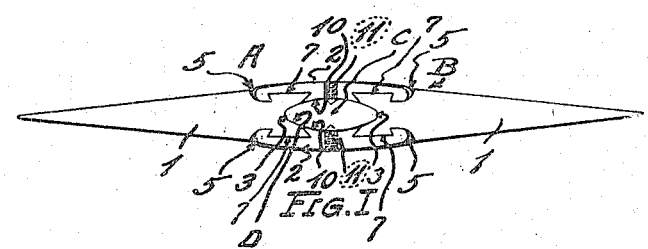
INVENTOR
FRANK ZGOL Patented Nov. 18, 1924.

1,515,715

UNITED STATES PATENT OFFICE.

FRANK ZGOL, OF SANDOVAL, ILLINOIS.

PICK.

Application filed February 3, 1923. Serial No. 616,868.

*To all whom it may concern:*

Be it known that I, FRANK ZGOL, a citizen of the United States of America, a resident of Sandoval, in the county of Marion, State of Illinois, have invented certain new and useful Improvements in Picks, of which the following is a full, clear, and exact description, reference being had to the accompanying drawings, forming a part of this specification.

This invention relates generally to picks, and particularly to a pick having parts which are so constructed and arranged that while the head portion of said pick will be rigidly secured to the handle thereof when said pick is in use, said pick-head may be quickly and easily removed from said handle when it is desired to do so.

Prior to this invention it was the practice for a miner to take four or five complete picks down into the mine when he reported for duty. This was necessary because the cutting edges of miners' picks are very rapidly dulled, due to the nature of the materials upon which said picks are used, and it was, of course, necessary to replace a dulled pick with a pick having sharp cutting edges. The necessity for the miner to be supplied with a number of complete picks arose from the fact that the handles of the picks heretofore used were very tightly wedged in the eye of the pick-head, and it was therefore a time-consuming task to remove said handle from said pick-head, hence instead of having a single handle which could be used with a number of pick-heads it was necessary for the miner to be supplied with a number of complete picks.

Another objection to the picks heretofore used was that in the event a handle was broken it was quite frequently necessary to burn the fragment of the handle from the pick-head due to the fact that it was impossible to disconnect said handle fragment from said pick-head in any other way. In removing the handle fragment from the pick-head in the manner described, said pick-head was subjected to the heat of a fire and the temper of the metal of which said pick-head was made was often destroyed thereby.

The pick disclosed in the present application comprises parts which are so constructed and arranged that the handle of said pick may be very quickly and easily removed from the pick-head thereof, thereby eliminating the objections recited above.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a plan view of my improved pick.

Fig. II is a side elevation of the pick shown in Fig. I, a portion of the handle of said pick being broken away to utilize space.

Fig. III is a perspective view of parts of my improved pick showing same in a partially assembled condition.

In the drawings, A designates a pick which comprises a head portion B and a handle C. The head portion B of my improved pick comprises a pair of cutting members 1 and a pair of connecting members 2 adapted to connect said cutting members together. At the inner end of each of the cutting members 1 is a U-shaped recess 3 and at each side of each of said recesses is a flat face 4. The flat faces 4, it will be observed by referring to Fig. II of the drawing, are not parallel with the axis of the handle C of the pick, but are slightly inclined with relation thereto. Formed in each side wall of each of the cutting members 1 is a notch 5, each of said notches being inclined in a direction opposite to the direction of inclination of the associated face 4 and each of said notches being provided with a flat face 6.

Each of the connecting members 2 is provided with a pair of dovetail grooves 7. The dovetail grooves 7 are wedge-shaped, said grooves being wider at their lower extremities than at the upper end thereof, and each of said grooves is adapted to receive that portion of one of the cutting members 1 which is located between a face 4 and an associated face 6. Each of the dovetail grooves 7 is provided with a flat face 8 and a similar flat face 9, said faces 8 and 9 being inclined, and adapted to cooperate with the faces 4 and 6 on the cutting members 1 in a manner to be hereinafter described. The inner portion of each of the connecting members 2 is provided with a curved face 10, said curved faces 10 and the U-shaped recesses 3 in the cutting members being adapted to cooperate in such manner when the pick-head B is assembled that an elliptical opening D, which receives the end of the pick-handle C, is formed through said pick-head.

To secure the pick-head of my improved pick to the handle thereof, the connecting members 2 are drawn upwardly with relation to the cutting members 1. The lower portions of the connecting members 2 are wider than the upper portions thereof, and because of this fact the cutting members 1 and the U-shaped recesses therein will be comparatively widely separated, hence the end of the handle may be very readily introduced into the space between said cutting members. The connecting members 2 are then driven downwardly with relation to said cutting members, and because the faces 8 on the connecting members 1, which cooperate with the faces 6 on the cutting members, are inclined inwardly toward the top of said cutting members, said cutting members will be cammed inwardly until the upper end of the handle C is tightly gripped between the inner portions of the cutting members 1, at which time the top faces of said connecting members will be approximately flush with the top faces of the cutting members 1, as shown in Fig. I of the drawing. To remove the handle C from the pick-head B, it is of course only necessary to drive the connecting members 2 upwardly, thus causing the cutting members 1 to move outwardly from said handle, thereby releasing their grip thereon.

To eliminate the danger of the connecting members 2 being accidentally moved while the pick is in use, I provide set screws 11, which pass through said connecting members and bite into the handle C.

I claim:

1. A tool comprising a head and a handle, said head comprising a pair of oppositely disposed members movable toward and away from each other in a longitudinal direction and adapted to engage said handle, and means including inclined faces whereby said oppositely disposed members are moved toward each other in a longitudinal direction to bring said members into frictional engagement with said handle to securely fix said head and said handle together.

2. A pick comprising a pick-head and a handle, said pick-head comprising a pair of oppositely disposed cutting members provided with inclined faces movable toward and away from each other in a longitudinal direction, and means provided with inclined faces adapted to cooperate with the inclined faces on said cutting members whereby said cutting members may be moved toward each other in a longitudinal direction to frictionally grip said handle to securely fix said pick-head to said handle.

In testimony that I claim the foregoing I hereunto affix my signature.

FRANK ZGOL.